United States Patent
Tax et al.

[15] 3,669,206
[45] June 13, 1972

[54] CONTAINER TRANSPORTING SYSTEM

[72] Inventors: Hans Tax; Rüdiger Franke, both of Munich, Germany

[73] Assignee: said Tax, by said Franke

[22] Filed: Aug. 19, 1969

[21] Appl. No.: 851,248

[30] Foreign Application Priority Data

Aug. 21, 1968 Germany..................P 17 98 090.4

[52] U.S. Cl..............................180/98, 318/587, 318/607, 246/63
[51] Int. Cl..........................................B62d 1/24
[58] Field of Search..............180/98, 79, 79.1; 318/16, 547, 318/587, 607; 246/63, 30

[56] References Cited

UNITED STATES PATENTS

| | | | |
|---|---|---|---|
| 3,270,199 | 8/1966 | Smith | 180/98 X |
| 2,847,080 | 8/1958 | Zworykin et al. | 180/98 |
| 3,009,525 | 11/1961 | Deliban | 180/79.1 X |
| 3,039,554 | 6/1962 | Hosking et al. | 180/79.1 X |
| 3,335,346 | 8/1967 | Borsattino et al. | 318/16 |
| 3,361,082 | 1/1968 | Leslie | 318/16 X |
| 3,474,877 | 10/1969 | Wesener | 180/98 |
| 3,498,403 | 3/1970 | Kohls | 318/547 X |

Primary Examiner—Kenneth H. Betts
Attorney—Low and Berman

[57] ABSTRACT

Containers transported on containerships and the like are transferred between storage and shipping areas by means of automatic vehicles which travel along guiding cables buried in the roadways connecting the several areas. The vehicles are steered and their drive systems controlled by means of steering and drive control signals generated at a central control station and transmitted by the guiding cables to sensing elements on the vehicles. A signal generator on each vehicle transmits continuous back signals to the control station through the cables and intermittent position signals through sensing elements at stopping stations along the roadways.

28 Claims, 12 Drawing Figures

CONTAINER TRANSPORTING SYSTEM

This invention relates to a handling system for vehicles adapted to carry the large containers increasingly used for transporting goods on ships and special trucks or railroad cars. The invention relates particularly to a container handling system in which containers are transferred between several loading areas.

Typically, the invention is applicable to container handling systems of the type required where containers are transferred between ships and land carriers. It is usually most economical to transfer the containers from one of the carriers to a storage area prior to loading on the other carrier to permit speedy turn-around of carriers. Special vehicles are being used for transfer of the containers between the carriers and storage areas.

Such vehicles heretofore were controlled by operators at a control station in each vehicle who steered the vehicles and controlled their speed of movement. Steering is unnecessary when the vehicles run on rails, but railbound vehicles are limited in their adaptability to changing conditions.

The primary object of the invention is the provision of a container handling system of the type described which employs roadable vehicles, that is, vehicles not requiring rails for their guidance, and makes it unnecessary to provide each vehicle with an operator.

In one of its basic aspects, the invention provides the roadway or roadways connecting the several loading areas of the system with a guiding conductor which extends in the roadway between the areas mentioned. Steering signal and drive control signal generators are connected to the conductor for transmitting steering and drive control signals to the same. The signals are sensed by sensing elements on each vehicle. The two sensing elements which are provided for sensing the steering signals are spaced on the vehicle transversely of the normal direction of vehicle movement. They simultaneously sense the same signal in the guiding conductor, and steering signal receivers respectively connected to the sensing elements issue corresponding output signals which are fed to a comparator circuit for generating an error signal in response to the difference of the two output signals. A steering control mechanism in the vehicle is connected to the comparator circuit and responds to the error signal for actuating the steering mechanism of the vehicle in such a manner that the magnitude of the error signal is changed toward a predetermined value, normally zero.

The sensed drive control signals are similarly fed to a circuit whose output signals cause the drive control mechanism of the vehicle to vary the speed of movement of the same.

Other features, additional objects, and many of the attendant advantages of this invention will readily become apparent from the following detailed description of a preferred embodiment when considered in connection with the appended drawing in which.

Figure 1:
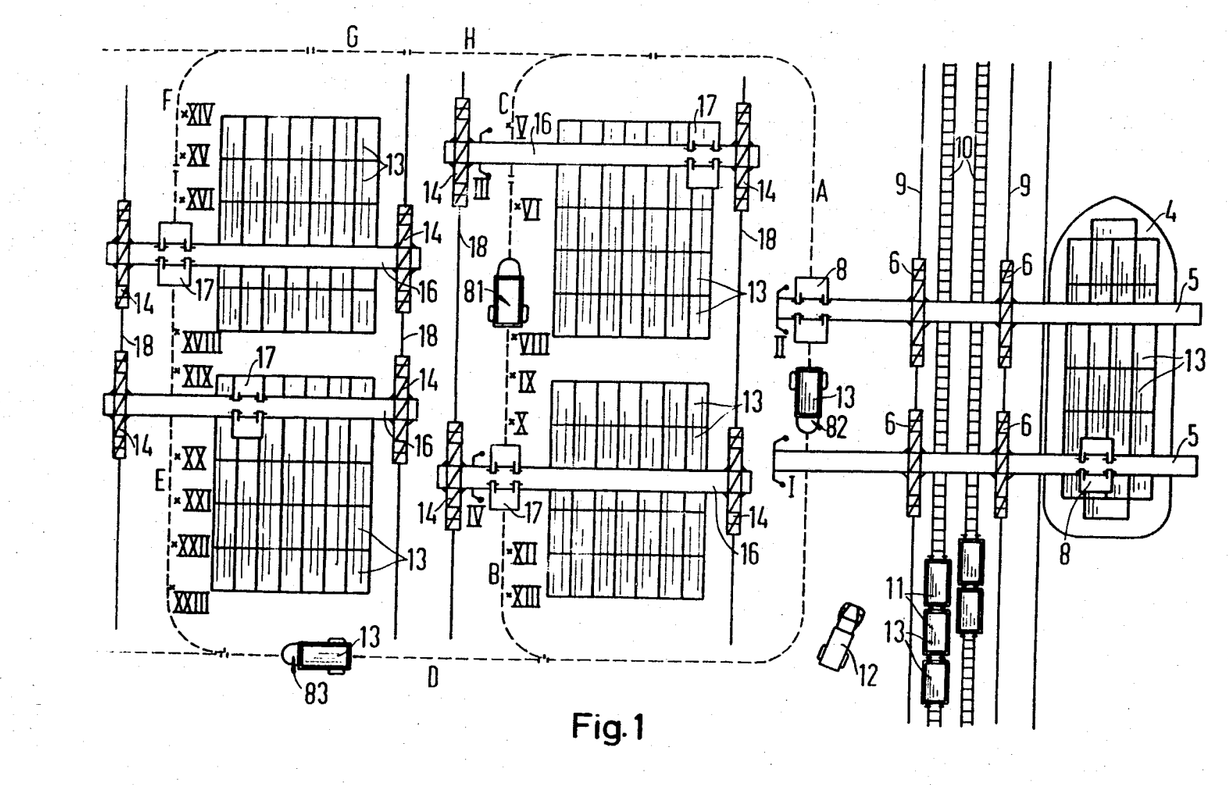
FIG. 1 is a plan view of a container handling system of the invention.

Referring initially to FIG. 1 there is shown a containership 4 carrying a deck load of containers 13 of generally rectangular configuration and having each a width and height greater than one meter, and a length of several meters. The ship 4 is moored alongside a dock on which two cranes are provided. Upright frames 6 of the cranes travel on rails 9 on the dock and are connected by horizontal bridges 5 extending at right angles to the dockside from above the ship 4 over railroad tracks 10 between the frames 6, to a loading area for trucks 12 and container transporting vehicles 81, 82, 83. Hoists 8 travel along the bridges 5 for transferring containers 13 between the ship 4, railroad cars 11 on the tracks 10, and the roadable vehicles 12, 81, 82, 83.

Four storage areas adjacent the dock are serviced by respective cranes whose bridges 16 extend between upright frames 14 traveling on rails 18. Each storage area is spanned by the bridge of an associated crane which carries a traveling hoist 17 for transferring containers 13 between the vehicles 81, 82, 83 and the storage area in which the containers are arranged in a rectangular pattern of rows and columns. The container handling system includes more than the four illustrated storage areas, and the illustrated land-based structures may be duplicated as often as needed.

The practically identical vehicles 81, 82, 83 travel on the roadways connecting the loading and unloading positions on the dock with corresponding loading and unloading positions at the storage areas in paths indicated in FIG. 1 by broken lines, and jointly constituting a pattern of rectangular loops having a common base passing under the cranes on the dock and varying in their width at right angles to the dock side. The broken lines indicate the locations of conducting cable sections, eight sections A – H being provided in the two roadway loops shown in their entirety in FIG. 1, and representative of other non-illustrated loops and associated devices.

23 stopping stations I to XXIII are distributed along the roadways in the two loops as will be described in more detail hereinafter. The stopping stations I to IV are associated with respective cranes and travel with the cranes. The other stopping stations are fixed and are each indicated in FIG. 1 by x.

Figure 2:
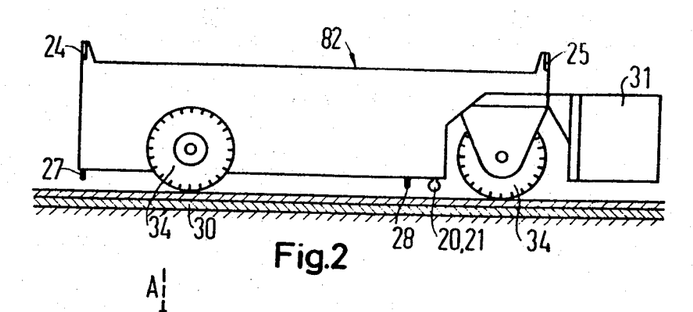
FIG. 2 shows a vehicle for carrying a container and the roadway on which the vehicle travels in the system of FIG. 1, the view being in side elevation and partly in section.
Figure 3:
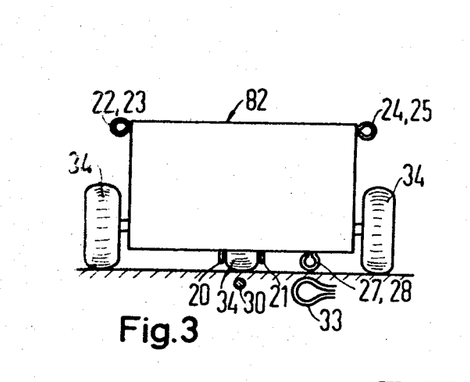
FIG. 3 shows the apparatus of FIG. 2 in rear elevation and partly in section.
Figure 4:
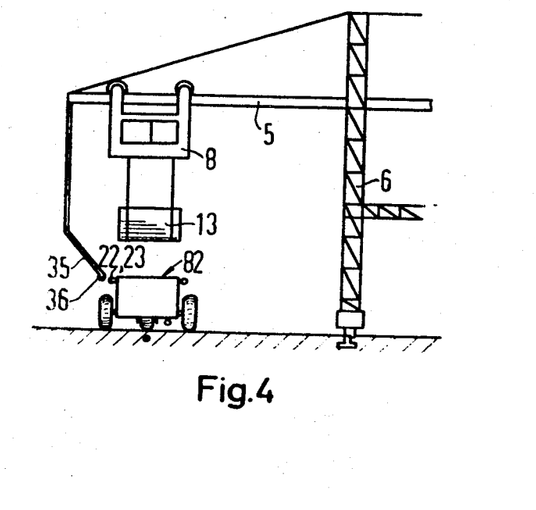
FIG. 4 is a rear elevational view of the vehicle of FIGS. 2 and 3 in loading position under a crane in the system of FIG. 1.

As is shown in FIGS. 2 and 3, the vehicle 82 which is representative of the several vehicles traveling along the loops for transferring containers 13 has a flat top pflatform on which the container may be deposited. The body of the vehicle is supported on three rubber-tired wheels 34 traveling on the road bed in which a cable section 30 is embedded closely below the surface.

The two rear wheels of the vehicle are driven, as will be explained hereinbelow, and the single front wheel is mounted in a fork rotatable in the vehicle body about an upright axis and equipped with an electrically operated steering mechanism. A heavy, semi-cylindrical bumper 31 projects beyond the front end of the vehicle in the manner of a cow catcher. It is guided on the vehicle body for movement longitudinally of the vehicle body over a distance of a few inches against the restraint of heavy compression springs, not shown, which normally hold the bumper in its foremost position.

Wire loops or induction coils 22, 23, 24, 25 are mounted on the four corners of the vehicle platform on non-illustrated insulating supports and laterally project beyond the vehicle body. The axes of the loops or coils are parallel to the normal direction of longidudinal vehicle movement. Similar loops 27, 28 project downwardly from the underside of the vehicle body in longitudinal alignment and are offset laterally from the vertical median plane of the vehicle. Additional loops 20, 21 are located at the lower front edge of the vehicle body. Their common axis is transverse to the length of the vehicle, and the loops 20, 21 are oppositely spaced by equal, small distances from the median vehicle plane.

Loops 33, of which only one is seen in FIG. 3, are buried in the roadway at various locations adjacent the cable sections 30 in such a manner that the loops 33 may be aligned vertically with the loops 27, 28 of each vehicle if the cable 30 is located in the vertical, longitudinal, median plane of the vehicle. As illustrated with reference to one of the cranes on the dock, each crane of the system shown in FIG. 1 is provided with a conductive loop or coil 36 suspended from the bridge 5 of the crane by means of a rigid bar 35 for proximal alignment with one of the loops 22–25 on a vehicle in position under the hoist 8 of the crane for receiving or delivering a container 13.

The several illustrated loops or coils are the transmitting and sensing elements in the remote control arrangements which steer the vehicles, control their speed of movement, stop them in specific locations along their paths, and signal the location of the vehicle back to a central control station, not explicitly shown in FIG. 1. The loops 20, 21 sense signals trans-mitted by the cable 30 for the purpose of steering the vehicle along the cable and for controlling its drive mechanism. They also transmit back signals to the cable. The loops 22, 23, 24, 25, 27, 28 transmit position signals from the vehicle to the sensing loops 33 in the roadway or the sensing loops 36 mounted on the crane bridges.

Figure 7:
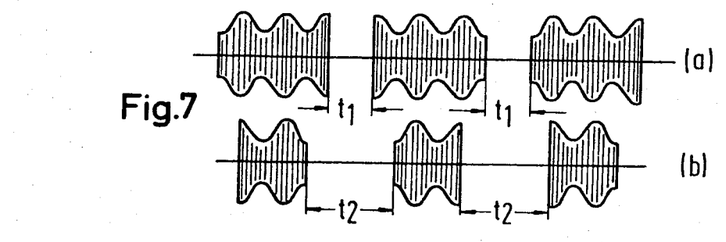
FIGS. 7a and 7b diagrammatically illustrate electrical signals employed in the system of the invention.

The electrical signals transmitted by the cable 30 to the vehicle are diagrammatically illustrated in FIGS. 7a and 7b. They have a relatively high carrier frequency (not explicitly illustrated) modulated by a lower modulating frequency, the modulated carrier frequency being interrupted at regular intervals to produce pulses. The two illustrated signals have a common carrier frequency, pulse frequency, and modulating frequency, but differ in the pulse duration and the pulse intervals $t_1, t_2$.

Figure 6:
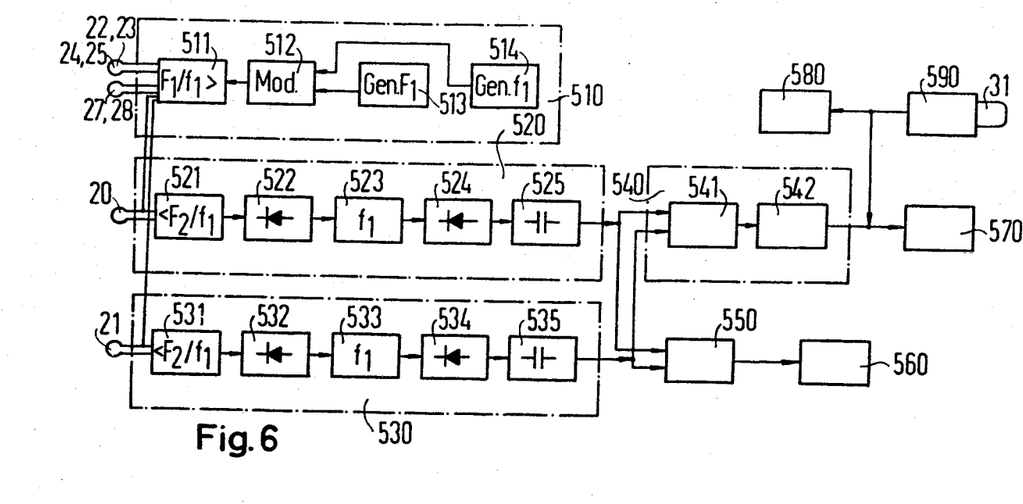
FIG. 6 is a block diagram of the steering and drive control arrangement in the vehicle of FIGS. 2 and 3.

The control and signal generating circuits of each vehicle are shown in the block diagram of FIG. 6.

The laterally juxtaposed loops 20, 21 are connected to the input terminals of receivers 520, 530 respectively. Each receiver includes an amplifier 521, 531 tuned to amplify signals having a carrier frequency $F_2$ common to all signals received by the vehicles, and a modulation frequency $f_1$ characteristic of the vehicle. The amplifier thus does not respond to signals intended to another vehicle. The carrier frequencies of the amplified proper signals are rectified in respective rectifiers 522, 532 of the receivers 520, 530, and the modulating frequency $f_1$ is filtered from the rectified signals in filter networks 523, 533, and rectified in rectifiers 524, 534. The rectified modulation signal is smoothed in smoothing circuits 525, 535 to produce direct-current output signals.

The output signals are fed to a comparator circuit 550 which produces an error signal indicative of the difference in the strength of the two input signals. The error signal is fed to the steering mechanism 560, not shown in detail, which includes an amplifier and an electric servo motor which turns the fork of the front wheel 34 to the right or left depending on the polarity of the error signal until the magnitude of the latter is reduced to zero.

The loops 20, 21 and the associated steering signal receivers 520, 530 are identical. The loops are arranged symmetrically relative to the longitudinal, vertical median plane of the vehicle which includes the vertical axis about which the front wheel 34 pivots. The error signal thus is reduced to zero when the vertical median plane of the vehicle includes the longitudinal axis of the cable 30. The vehicle is steered along the cable 30 as long as steering signals are transmitted from the latter.

The rear wheels 34 of the vehicle 82 are driven by a continuously operating diesel engine through a torque converter adjustable for varying the transmitted torque between values of zero and a maximum, the drive mechanism 570 being basically conventional and not shown in detail in the drawing.

The output signals of the two receivers 520, 530 are also fed to an adding circuit 541 in a drive control unit 540 to produce a signal of an amplitude proportional to the sum of the two receiver outputs, and thus to the ratio between pulse duration and pulse intervals in the signals transmitted by the cable 30.

The output signal of the adding circuit 541 is fed to an amplifier and a servomotor energized by the amplifier, and jointly indicated at 542 in FIG. 6. The servomotor sets the torque transmitted by the converter interposed between the non-illustrated diesel engine and the rear wheel 34. When the ratio of pulse duration to pulse interval in the signal illustrated in FIG. 7a or FIG. 7b is increased, the applied torque and the speed of the vehicle are increased by the increased strength of the input signals to the adding circuit 541, and the resulting higher output of the servo amplifier. In the absence of a signal, the drive stops.

The diesel engine also drives a generator of a conventional auxiliary electrical system and the compressor of a pneumatic system, not shown. The vehicle is equipped with air brakes 580, not shown in detail, which may be energized by the bumper 31. When the bumper 31 hits an obstacle, such as another vehicle, it is displaced inward of the vehicle body against the restraint of its spring and closes a limit switch. A relay system in circuit with the switch opens a solenoid valve connecting the compressor to the air brakes and sets the torque converter in the drive mechanism 570 to zero torque, as diagrammatically shown in FIG. 6, the brake control circuitry associated with the bumper being indicated in FIG. 6 at 590.

The vehicle 82 further carries apparatus 510 for generating back signals and position signals to be transmitted to the central control station. It includes an oscillator 513 for generating a continuous signal of the carrier frequency $F_1$, different from the afore-mentioned carrier frequency $F_2$. The carrier signal is modulated in a modulator 512 with a signal of a modulating frequency $f_1$ characteristic of the vehicle and generated in an oscillator 514. The modulated carrier signal is amplified in an amplifier 511 tuned to the frequencies $F_1$ and $f_1$, and fed to the several loops or coils 20 to 25, 27, and 28. Back signals are thus transmitted continuously to the control station from the loops or coils 20, 21, and position signals are transmitted from time to time when one of the loops 22 to 25, 27, and 28 comes within the operation range of the sensing loops 33 in the roadway or the loops 36 on the cranes.

Figure 8:
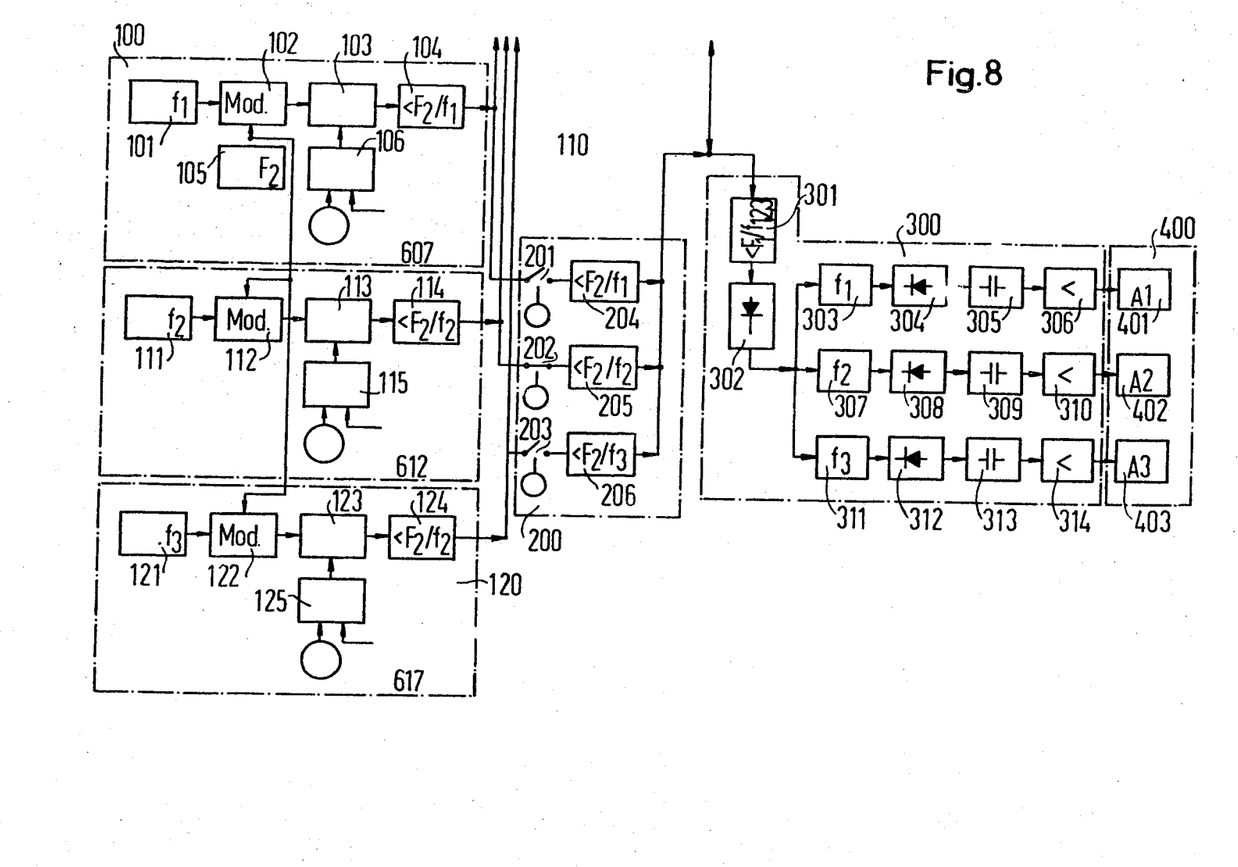
FIG. 8 is a block diagram of elements in a central control station in the system of FIG. 1.

The apparatus of the central control station is partly illustrated in FIG. 8. Three signal generators or transmitters 100, 110, 120 at the control station are associated with the vehicles 81, 82, 83 respectively and differ from each other only in the modulation of their signals. An oscillator 105 common to the three transmitters generates a carrier signal of the frequency $F_2$. Oscillators 101, 111, 121 in the three transmitters respectively generate modulating signals of frequencies $f_1$, $f_2$, $f_3$ which are combined with the carrier signals in modulators 102, 112, 122. The modulated carrier signals are cyclically passed by gate circuits 103, 113, 123 according to control signals intermittently received from pulse generators 106, 115, 125. The latter are controlled by control circuits 607, 612, 617 as will be described in more detail hereinbelow, and also by manual controls indicated by circles which permit the ratio of pulse duration to pulse interval to be varied between zero and a maximum value for varying the speed of the associated vehicle in the manner described above. The pulsed signals are amplified in tuned first amplifier stages 104, 114, 124 and fed to a battery of distributor switches, only one group 200 of such switches associated with the cable section A being shown in FIG. 8.

The group 200 includes three manually operated single-pole, single-throw switches 201, 202, 203 interposed between the first amplifier stages 104, 114, 124 and corresponding second selective amplifier stages 204, 205, 206. The output terminals of the second amplifier stages are connected in parallel with each other and with a single conductor leading to section A of the cable 30, all return leads being grounded. The switches 201, 202, 203 may be mechanically interlocked to permit only one of the switches to be closed at any one time. In the illustrated position of the group 200, the switch 202 is closed to provide steering and drive control signals to the vehicle tuned to the characteristic modulating frequency $f_2$ so that this selected vehicle only can move on the portion of the roadway in which the cable section A is embedded, and the selected vehicle can move only along the cable section A which is electrically insulated from the other cable sections and not capable of inductive or capacitive coupling to the other sections.

The conductor which feeds steering and drive control signals to the cable section A, also feeds back signals to the central control station. The back signals are inductively transmitted to the cable section A by the loops or coils 20, 21 whose sensing function has been described above. Each cable section is conductively connected with a back signal receiver in the control station, only the receiver 300 for the section A being seen in FIG. 8.

A preamplifier 301 in the receiver 300 is tuned for the carrier frequency $F_1$ common to the carrier frequency oscillators of the three vehicles 81, 82, 83, and to the three characteristic modulation frequencies. The carrier frequencies of the preamplified back signals are rectified in a rectifier 302 and the partly rectified signals are fed to input terminals of three filter networks 303, 307, 311 respectively permeable to the modulation frequencies $f_1, f_2, f_2$, and each followed, in sequence, by a rectifier 304, 308, 312, a smoothing circuit 305, 309, 313, and an amplifier 306, 310, 314.

Figure 10:
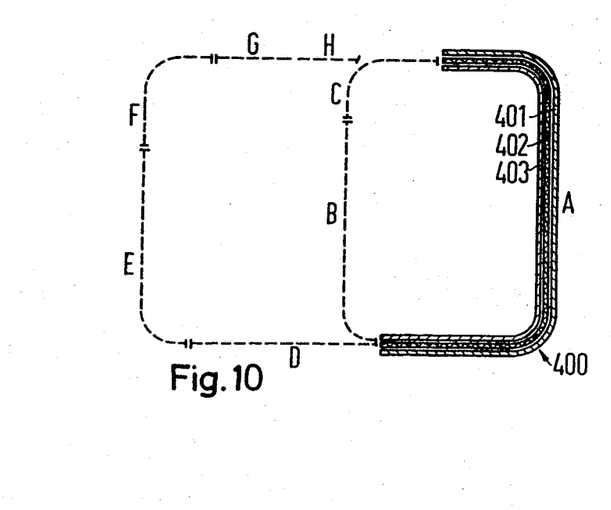
FIG. 10 illustrates a display device for use at the control station in fragmentary elevation.

The output signals of the receiver 300 are fed to a display device 400 partly illustrated in FIG. 10. The device consists of a board on which tubular light bulbs are arranged. Each cable section A – H is represented in the display device by as many tubular light bulbs as there are vehicles, the bulbs being shaped to represent the shape of the corresponding cable sections, and the several bulbs associate in the section with the several vehicles being arranged in parallel and differently colored, as exemplified for section A in FIG. 10 by the differently colored light bulbs 401, 402, 403. These bulbs are connected to the output terminals of the amplifiers 306, 310, 314 respectively so that the approximate position of each vehicle is indicated by a luminous display of its characteristic color on the board 400.

Figure 11:
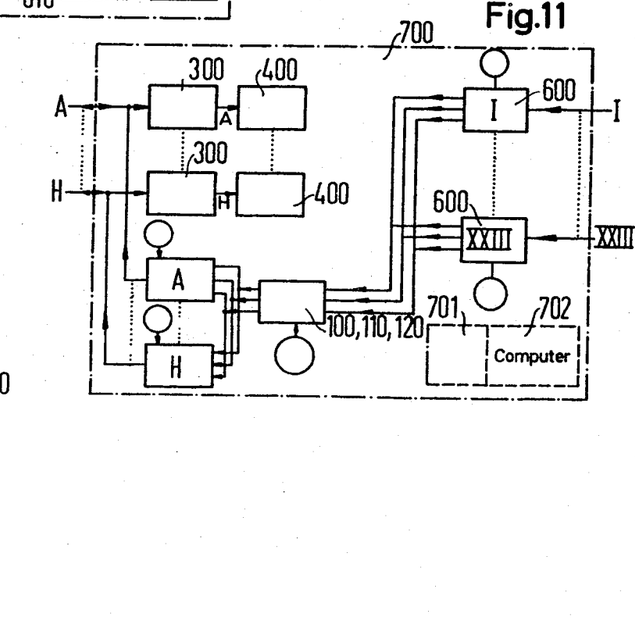
FIG. 11 is an overall block diagram of the central control station.

The general layout of the central control station 700 is shown in FIG. 11. The several sensing coils 33 or 36 at the 23 stopping stations I to XXIII are conductively connected to as many position signal receivers 600 in the control station. Three output leads from each position control receiver are respectively connected to the three drive control and steering signal transmitters 100, 110, 120, and more specifically to the afore-mentioned pulse generators 116, 115, 125. FIG. 11 also shows the connection between the transmitters 100, 110, 120 and the switch groups 200 associated with the several cable sections, and the connections of the latter with the display device 400 by way of the back signal receivers 300.

Figure 9:
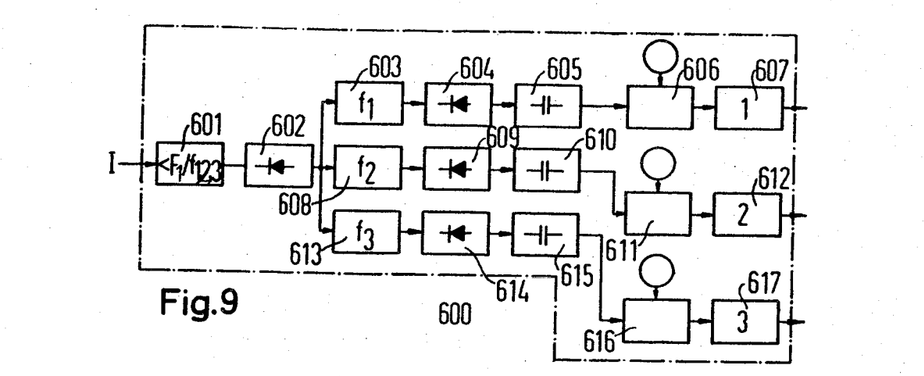
FIG. 9 shows other elements of the central control station in the manner of FIG. 8.

One of the position signal receivers 600 associated with the stopping station I is shown in more detail in the block diagram of FIG. 9. It will be appreciated that the position signals are identical with the afore-described back signals. However, the back signals are continuously transmitted by the cable 30 whereas the position signals are received in the central control station only when a vehicle comes within the short operational range of one of the position signal sensing elements 33, 36.

An amplifier 601 at the input end of the receiver 600 is tuned to the carrier frequency $F_1$ and the characteristic modulating frequencies $f_1, f_2, f_3$ of the three vehicles. The carrier frequency of the amplified position signal is rectified in a rectifier 602. The signals of modulating frequency are then passed to one of three receiver sections by filter circuits 603, 608, 613, each section further including a rectifier 604, 609, 614, a smoothing circuit 605, 610, 615 and a manually switched three-position actuator 606, 611, 616 which is electro-magnetically stepped and manually reset, and operates a rotary voltage selector 607, 612, 617 providing a control voltage for the pulse generator 106, 115, 125 in an associated steering and drive control signal transmitter 100, 110, 120.

When in its rest position, the stepping actuator sets the voltage selector for normally pulsed operation of the associated gate circuit, as manually set on the pulse generator. When it is desired to stop a vehicle 81, 82, 83 as it passes one of the position sensing elements 33, 36 at a stopping station, the actuator 606, 611, 616 is switched on. Two position signals are sequentially sensed as the paired transmitting loops 22, 23 or 24, 25 or 27, 28 pass the vicinity of the sensing element 33, 36. The first position signal causes the actuator to turn the voltage selector to a control voltage at which the ratio of pulse duration to pulse interval is reduced. If the initial or normal drive control signal is represented by FIG. 7a, the first position signal causes a change to the drive control signal of FIG. 7b, and a slowing down of the controlled vehicle almost to an inching speed.

When the second position transmitting loop 23, 25, or 28 travels past the position sensing loop 33, 36, another position signal is transmitted to the receiver 600, and the voltage selector is turned to its third position in which the pulse generator is deactivated. The transmission of drive control signals ceases, and vehicle stops at a precisely predictable point. If it is desired to move the vehicle again beyond the starting station, the actuator is returned manually to its starting position. The actuator is simultaneously disconnected from the preceding elements of the associated position signal receiver section so that the vehicle is not stopped when next passing the station I even though position signals are sensed by the loops 33 or 36.

The vehicles may also be stopped at the several stations 1 to XXIII by an arrangement which employs the induction coils or loops 33, 36 as transmitting elements rather than as sensing elements. They are energized by stopping signal generators at the central control station through selector switches as described and illustrated with reference to the drive control signal generators 100, 110, 120 and the selector switches 200. The loops 22–25, 27 and 28 on the vehicle are employed as sensing elements for two selective receivers on the vehicle, analogous to the receivers 520 and 530, the loops 23, 25, 28 at the vehicle front being connected to one receiver, and the loops 22, 24, 27 being connected to the other receiver. When one of the front loops passes the transmitting element of stopping station, the output signal of the associated receiver causes the vehicle speed to be reduced by acting either on the servo mechanism 542 or directly on the torque converter in the drive 570. The output signal of the second stopping signal receiver causes the brake 580 to be applied or the flow of drive control signals to be interrupted. The vehicle thus can be stopped precisely although the inert mass of the vehicle, particularly when loaded, is great.

Figure 5:
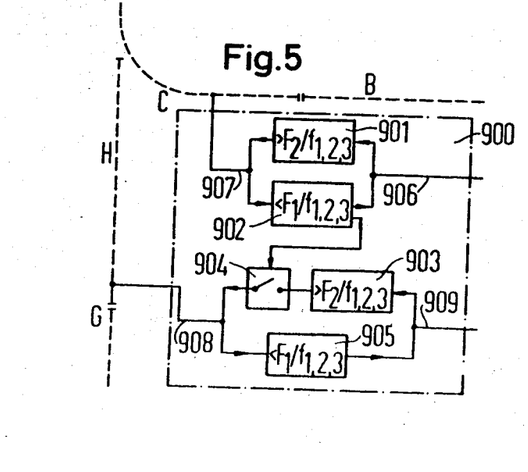
FIG. 5 is a block diagram of a collision preventing circuit in the system of FIG. 1.

The looped paths of the vehicles 81, 82, 83, as shown in FIG. 1 are connected at forks at which the ends of three cable sections meet, and a vehicle may move from one section of the roadway to either one of two other sections, and at junctions at which vehicles coming from two different sections continue their movement on a portion of the roadway which is common to two or more loops. An automatic system 900 provided at each junction to prevent collision of two vehicles coming from different directions is illustrated in FIG. 5 with specific reference to the roadway sections in which the cable sections C and H are embedded. The vehicles move clockwise in the roadway loops, as viewed in FIG. 1, and two vehicles may thus travel along cable sections C and H simultaneously to a junction of the same.

The single conductor which connects the central control station 700 with the cable section C is divided into two longitudinal parts 906, 907, and two tuned amplifiers 901, 902 are interposed in parallel circuits between the two conductor parts in such a manner that amplifier 901 amplifies the steering and drive control signals received from the control station 700 and having a carrier frequency $F_2$ and feeds them to the cable section C through the conductor part 907. The amplifier 902 amplifies back signals received from the cable section C and having a carrier frequency $F_1$ for transmission to the control station 700 through the conductor part 906. Moreover, the coil of a normally closed electromagnetic switch 904 is connected to the output of the amplifier 902 and energized whenever a back signal reaches the amplifier.

The conductor leading from the control station 700 to the cable section H is similarly divided into two parts 908, 909 connected by two amplifiers 903, 905 respectively identical with the amplifiers 901, 902. The contacts of the switch 904 are in the output line of the amplifier 903, and the switch 904, when opened, prevents the transmission of drive control signals to the cable section H. It is thus impossible for a vehicle to move along the cable section H toward the section C while another vehicle approaches the junction with the section H along the section C.

Numerous modifications may obviously be made in the afore-described embodiment of a container handling system of the invention without departing from the spirit and scope of the invention, and such modifications may be necessary under special conditions. The sensing elements 20, 21 cannot effectively pick up drive control and steering signals from the buried cable 30 in the vicinity of heavy pieces of ferrous metal, such as railroad tracks which may have to be crossed by the vehicles 81, 82, 83 in their normal operation. The provision of an additional set of sensing elements at the rear end of the vehicle in respective parallel circuits with the loops 20, 21 overcomes this problem. Similar duplication of elements may be resorted to wherever desirable.

Four-wheeled vehicles having a more elaborate and complex steering system have been used successfully instead of the afore-described three-wheeled container transporting vehicles, and it will be appreciated that this invention does not reside in the specific steering mechanism nor in the drive mechanism as such.

Arrangements for steering vehicles and for changing their speed in response to electrical signals other than those specifically described above are known, and may be used in the described vehicles.

Three vehicles associated with a common central control station have been referred to by way of example. The modifications in the illustrated system required to adapt the control station to more or less than three vehicles will be obvious. The system is useful even where only one vehicle is to be controlled.

While not specifically illustrated, the vehicles 81, 82, 83 are equipped with manual controls which permit them to be steered and their speed varied by an operator. The vehicles may thus move automatically in the loop-shaped paths defined by the cable 30, and may be controlled manually by an operator when moving elsewhere. However, only automatic operation is effective in moving the vehicles into alignment with the several cranes if the cranes are similarly operated by automatic controls, without the intervention of a human operator. Only the automatic system described above can position the vehicles with sufficient precision to ensure smooth cooperation with automatically operated cranes.

Manual control of certain devices in the central control station has been referred to above, but the necessary setting of control elements may be performed by hydraulic, pneumatic, or electromagnetic actuators controlled by programming devices whose commands are executed when conditions as sensed by automatic devices and evaluated by a computer are proper.

What is claimed is:

1. In a container handling system including two container loading areas, a roadway connecting said areas, a roadable, self-propelled vehicle capable of traveling between said areas on said roadway while carrying a container, said vehicle including drive control means for varying the speed of movement of said vehicle, and steering means for steering the vehicle during said movement, the improvement which comprises:
   a. a guiding conductor (30) extending in said roadway between said areas;
   b. steering signal generating means (110) conductively connected to said conductor for transmitting steering signals to the same;
   c. two steering signal sensing means (20, 21) spaced on said vehicle transversely of the normal direction of vehicle movement for simultaneously sensing said steering signals in said conductor;
   d. two steering signal receiving means (520,530) mounted on said vehicle in respective circuits with said sensing means for issuing output signals corresponding to the second steering signals;
   e. comparator means (550) connected with said receiving means for receiving said output signals, and responsive to a difference in said output signals for generating an error signal;
   f. steering control means (560) connected to said comparator means and responsive to said error signal for actuating said steering means and for thereby changing the magnitude of said error signal toward a predetermined value;
   g. drive control signal generating means (110) conductively connected to said conductor for transmitting drive control signals to the same;
   h. drive control signal sensing means (20, 21) on said vehicle for sensing said drive control signals; and
   i. drive control signal receiving means (520,530) mounted on said vehicle in circuit with said drive control signal sensing means for issuing output signals corresponding to the sensed drive control signals,
      1. said drive control means (540) being connected to said drive control signal receiving means and responsive to the output signals of the same for varying said speed,
      2. said drive control signal sensing means being constituted by at least one of said steering signal sensing means.

2. In a system as set forth in claim 1, said drive control signal receiving means being constituted by at least one of said steering signal receiving means.

3. In a system as set forth in claim 2, said steering signals and said drive controls signals being constituted by a single sequence of signals in said guiding conductor.

4. In a container handling system including two container loading areas, a roadway connecting said areas, a roadable, self-propelled vehicle capable of traveling between said areas on said roadway while carrying a container, said vehicle including drive control means for varying the speed of movement of said vehicle, and steering means for steering the vehicle during said movement, the improvement which comprises:
   a. a guiding conductor (30) extending in said roadway between said areas;
   b. steering signal generating means (110) conductively connected to said conductor for transmitting steering signals to the same;
   c. two steering signal sensing means (20, 21) spaced on said vehicle transversely of the normal direction of vehicle movement for simultaneously sensing said steering signals in said conductor;
   d. two steering signal receiving means (520,530) mounted on said vehicle in respective circuits with said sensing means for issuing output signals corresponding to the second steering signals;
   e. comparator means (550) connected with said receiving means for receiving said output signals, and responsive to a difference in said output signals for generating an error signal;
   f. steering control means (560) connected to said comparator means and responsive to said error signal for actuating said steering means and for thereby changing the magnitude of said error signal toward a predetermined value;
   g. drive control signal generating means (110) conductively connected to said conductor for transmitting drive control signals to the same;
   h. drive control signal sensing means (20,21) on said vehicle for sensing said drive control signals; and
   i. drive control signal receiving means (520,530) mounted on said vehicle in circuit with said drive control signal sensing means for issuing output signals corresponding to the sensed drive control signals,
      1. said drive control means (540) being connected to said drive control signal receiving means and responsive to the output signals of the same for varying said speed,
      2. said drive control signals being constituted by a sequence of pulses, 3. said output signals of said drive control signal receiving means being constituted by a sequence of pulses, 4. said drive control means responding to changes in the ratio between the duration of the pulses constituting said output signals of the drive control signal receiving means and the spacing of said last-mentioned pulses for varying the speed of said vehicle.

5. In a system as set forth in claim 4, said drive control signals having a carrier frequency and being modulated with a modulating frequency, and said drive control receiving means including filter means (523, 533) for selectively passing said modulating frequency.

6. In a container handling system including a plurality of container loading areas, a plurality of connected roadways extending between said areas, a plurality of roadable, self-propelled vehicles, each vehicle being capable of traveling between said areas on said roadways while carrying a container, each vehicle including drive means for moving said vehicle on said roadways, drive control means connected to said drive means for controlling the speed of movement of said vehicle, and steering means for steering the vehicle during said movement, the improvement which comprises:
  a. guiding conductor means (30) extending in each roadway between said areas for guiding said vehicles;
  b. a plurality of drive control signal generating means (100, 110, 120) conductively connected to said conductor means for transmitting thereto respective drive control signals associated with respective ones of said vehicles (81,82,83);
  c. drive control signal sensing means (20, 21) on each vehicle for sensing said drive control signals; and
  d. selective drive control signal receiving means (520, 530) mounted on each vehicle in circuit with said drive control sensing means for issuing output signals corresponding only to drive control signals sensed by said sensing means and associated with said vehicle,
    1. said drive control means (540) being connected to said drive control signal receiving means and responsive to the output signals of the same for varying the speed of said vehicle.

7. In a system as set forth in claim 6, said drive control signals each having a carrier frequency and being cyclically modulated, the drive control signals respectively associated with said vehicles differing from each other by the modulation frequencies thereof, each of said drive control signal receiving means including filter means for selectively passing signals of the associated modulation frequency only.

8. In a system as set forth in claim 7, each of said drive control signal generating means including carrier frequency generating means (105) for generating electrical oscillations of a first carrier frequency, modulating frequency generating means (101, 111, 121) for generating electrical oscillations of a modulating frequency, modulator means (102, 112, 122) for modulating said oscillations of said carrier frequency with said oscillations of said modulating frequency, gate circuit means (103, 113, 133) for intermittently interrupting the modulated oscillations of said carrier frequency, and pulse generator means (106, 115, 125) adjustable for varying the duration and the spacing of the pulses generated, and connected to said gate circuit means for operating the same.

9. In a system as set forth in claim 8, said carrier frequency generating means being common to each of said plurality of drive control signal generating means.

10. In a system as set forth in claim 6, said guiding conductor means including a plurality of elongated conductor sections, insulating means electrically insulating said sections from each other, and connecting means for selectively connecting said sections to respective ones of said drive control signal generating means.

11. In a system as set forth in claim 10, three of said sections having respective longitudinally terminal, closely juxtaposed portions, and extending from the respective terminal portions in different directions to constitute a fork.

12. In a system as set forth in claim 6, back signal generating means (510) on each of said vehicles for generating a back signal, and back signal transmitting means on said vehicle connected to said back signal generating means for transmitting said back signal to said conductor means.

13. In a system as set forth in claim 12, said back signal transmitting means being constituted by said drive control signal sensing means.

14. In a system as set forth in claim 13, the back signals generated by the respective back signal generating means on said plurality of vehicles differing from each other.

15. In a system as set forth in claim 14, each back signal having a carrier frequency and being cyclically modulated, the back signals respectively associated with said vehicles differing from each other by the modulation frequencies thereof, each of said back signal generating means (510) including generator means (513) for generating oscillations of said carrier frequency, generator means (514) for generating electrical oscillations of said modulation frequency, and modulator means (512) for modulating said oscillations of said carrier frequency with said oscillation of said modulation frequency.

16. In a system as set forth in claim 12, said guiding conductor means including a plurality of elongated conductor sections insulated from each other, the system further including a control station (700) including said drive control signal generating means, said station further including selector means for selectively connecting said drive control signal generating means with said conductor sections respectively and, a plurality of back signal receiving means (300) connected with said conductor sections respectively for receiving a back signal transmitted to the same.

17. In a system as set forth in claim 16, each of said conductor sections being connected with said station by means of a single conductive line only, said drive control signals and said back signal being transmitted between each section and said station by said single line.

18. In a system as set forth in claim 16, the back signals generated by the respective back signal generating means on said plurality of vehicles differing from each other, and each of said back signal receiving means including selector means (303, 307, 311) for separating the back signals of said vehicles from each other.

19. In a system as set forth in claim 16, said control station further including display means (400) for pictorial representation of said conductor means, said display means including a plurality of indicating means associated with said conductor sections respectively for indicating the presence and identity of one of said vehicles within range of the associated conductor section, said indicating means being respectively connected to said back signal generating means for actuation thereby.

20. In a system as set forth in claim 10, a plurality of stopping signal transmitting means located on said roadways adjacent said conductor sections respectively, stopping signal sensing means on each of said vehicles, stopping signal generating means connected to each of said stopping signal transmitting means, stopping signal receiving means on each vehicle connected to the stopping signal sensing means on the same and responsive to a sensed stopping signal to generate an output signal, said drive control means of the vehicle being connected to said stopping signal receiving means and responsive to the output signal of the same for stopping said vehicle.

21. In a system as set forth in claim 20, said stopping signal sensing means on each vehicle including two stopping signal sensing elements spaced on said vehicle in the normal direction of movement of the vehicle, said drive control means responding to the output signal of said stopping signal receiving means generated by a stopping signal sensed by one of said sensing elements to reduce the speed of said vehicle, and said drive control means responding to the output signal of said stopping signal receiving means generated by a stopping signal sensed by the other sensing element to stop said vehicle.

22. In a system as set forth in claim 10, a control station, a plurality of position signal sensing means (33, 36) spaced from each other on said roadways, position signal transmitting means (22, 23, 24, 25, 27, 28) on each of said vehicles for transmitting a position signal capable of being sensed by said position signal sensing means when the vehicle is adjacent said sensing means for generating a position signal characteristic of said vehicle and connected to said position signal transmitting means on said vehicle for transmission of the characteristic signal, and a plurality of position signal receiving means (600) in said control station operatively connected with said position signal sensing means respectively.

23. In a system as set forth in claim 22, filter means (603, 608, 613) in each of said position signal receiving means for separating the position signals characteristic of said vehicles.

24. In a system as set forth in claim 23, deactivating means connected to said drive control signal generating means and to said position signal receiving means for selectively deactivating the drive control signal generating means associated with one of said vehicles in response to a selected position signal characteristic of said one vehicle.

25. In a system as set forth in claim 22, said position signal transmitting means on each vehicle including two position signal transmitting elements spaced on said vehicle in the normal direction of movement of said vehicle, and circuit means connecting said position signal receiving means with the driving control signal generating means associated with each of said vehicles for generating a drive control signal for reducing the speed of said vehicle in response to a signal transmitted by one of said position signal transmitting elements, and for deactivating said associated drive control signal generating means in response to a position signal transmitted by the other position signal transmitting element.

26. In a system as set forth in claim 10, a plurality of said conductor sections constituting a junction, the system further including collision preventing means (900) for preventing two of said vehicles respectively guided by said sections of said conductor means from simultaneously approaching said junction.

27. In a system as set forth in claim 26, said drive means of each vehicle being arrested when said drive control means thereof are deactivated, and circuit means connected to the drive control signal generating means associated with one of said two vehicles and responsive to the approach of the other one of said two vehicles to said junction for deactivating said associated drive control signal generating means and for thereby deactivating the drive control means of said one vehicle.

28. In a system as set forth in claim 6, deactivating means for deactivating said drive means on each of said vehicles, impact sensing means on the front portion of each vehicle and facing in the normal direction of vehicle movement, and connecting means connecting said impact sensing means to said drive means for deactivating the latter upon impact of said sensing means on an obstacle.

* * * * *